United States Patent [19]
Führing et al.

[11] 3,883,325
[45] May 13, 1975

[54] METHOD OF AND APPARATUS FOR THE RECOVERY OF SOLVENT GASES FROM AN AIR STREAM

[75] Inventors: Heinrich Führing, Augsburg; Johannes Helmut Sieber, Aystetten, both of Germany

[73] Assignee: Böwe Böhler & Weber Maschinenfabrik, Augsburg, Germany

[22] Filed: Mar. 21, 1973

[21] Appl. No.: 343,535

[30] Foreign Application Priority Data
Mar. 23, 1972 Germany............................ 2214153

[52] U.S. Cl. ........................... 55/20; 55/25; 55/74; 55/163; 55/179
[51] Int. Cl............................................ B01d 53/04
[58] Field of Search ............... 55/20, 30, 31, 32, 33, 55/59, 62, 74, 163, 179, 180, 198

[56] References Cited
UNITED STATES PATENTS

| | | | |
|---|---|---|---|
| 3,274,755 | 9/1966 | Montagnon et al. | 55/59 |
| 3,486,305 | 12/1969 | Zimmermann | 55/198 |

OTHER PUBLICATIONS

American Inst. of Mining & Metallurgical Engineers, Tech. Publication No. 1628, Chen Chum Ku, Dallas, May 1943, 13 pp.

*Primary Examiner*—Charles N. Hart
*Assistant Examiner*—Ferris H. Lander
*Attorney, Agent, or Firm*—Karl F. Ross; Herbert Dubno

[57] ABSTRACT

An air stream from a treatment vessel, e.g., the drum of a drycleaning machine or a device for the degreasing of metals using an organic solvent, is passed through a cooler to reduce condensable-component level in the air stream before being introduced into an absorber in which solvent residues are removed. Between the cooler and the absorber, the air stream is reheated so that the relative humidity of the gas entering the absorber is well below 100 percent. Preferably, the air stream is circulated through the cooler and the heater for a period sufficient to reduce the level of condensable components in the air stream to the point that the adsorber will not be immediately saturated thereby, whereupon the adsorber is brought into play.

10 Claims, 2 Drawing Figures

METHOD OF AND APPARATUS FOR THE RECOVERY OF SOLVENT GASES FROM AN AIR STREAM

FIELD OF THE INVENTION

The present invention relates to a method of and an apparatus for the recovery of solvent gases from an air stream which is derived from a treatment vessel in which, for example, textiles or metal products are treated with organic solvents. More particularly, the invention relates to improvements in such systems which employ adsorber arrangements for extracting traces of organic solvent from an air stream.

BACKGROUND OF THE INVENTION

Systems for the treatment of articles of various types with organic solvents have long been known and it is not unknown to terminate the treatment with a drying step in which air is passed through the vessel to entrain the solvent residues therefrom. Subsequently, the solvent must be recovered from the air stream before the latter is released into the atmosphere, not only because the failure to recover solvent will render the process uneconomical, but also because the solvent may be noxious or toxic and can constitute an environmental pollutant.

For example, apparatus for the chemical cleaning (drycleaning) of garments and other textile material or systems for the degreasing of metals using an organic solvent, are generally provided with means for introducing the solvent in a liquid state into the vessel, means for agitating the liquid solvent in contact with the objects to be treated, and means for draining the solvent from the vessel. Subsequently, an air stream is passed through the vessel to remove traces of the organic solvent.

The solvents which are employed are not only expensive but are also more or less toxic. They include primarily hydrocarbons and especially chlorinated and/or fluorinated hydrocarbons. The solvents may be of the relatively high boiling type, e.g., perchloroethylene and trichloroethylene, or of a low boiling type, such as trichlorotri-fluoroethylene and trichloromo-nofluoromethane. It has already been pointed out that a drying operation requires passage of an air stream, especially air, through the treatment vessel to remove traces of the solvent and subsequent recovery of the solvent from the air stream so that such toxic and expensive impurities will not be discharged into the environment.

It has been proposed to provide a drycleaning machine with an activated-carbon adsorber along the air-circulation path so that the gaseous-solvent residue, entrained by the air stream, can be entrapped by physico-chemical properties upon the adsorbent. In other systems, it has been the practice to provide a condenser along the air-circulating path for reducing the temperature of the air stream to a point such that the entrained solvent will condense therefrom. The condensation system has the disadvantage that it frequently is not capable of removing the last traces of solvent so that any release of the circulating air into the atmosphere may cause environmental pollution. Theoretically, the use of an adsorbent having a high affifity for the solvent and being ordinarily capable of greater purification of an air stream, would appear to be the solution to this problem.

However, it is found that water vapor picked up and carried by the air stream and derived, for example, from the garments treated, from the adsorber itself, or from some other source, impedes the operation of the adsorber and at least in the portions of the adsorber bed adjacent the inlet, gives rise to early saturation of the adsorber and inefficient recovery of the solvent. Furthermore, the simple substitution of an adsorber for a condenser is not satisfactory since at least during initial drying stages, the solvent concentration in the circulating air stream is so high as to rapidly saturate the entire adsorber bed unless measure are taken to prevent such saturation.

It has been suggested, in this connection, to provide a cooler ahead of the adsorber bed along the air-circulation path to lower the temperature of the air and thereby condense a substantial proportion of the solvent therefrom before the air stream, containing only residual solvent vapors, encounters and adsorber bed. While this expedient prevents saturation of the bed with solvent at an early point in the operating process, it has the disadvantage that the cooled gases emerging from the cooler and entering the bed are so close to the dewpoint that the relative humidity or moisture content is substantially 100 percent. When this cooled gas contacts the adsorber bed, it renders the latter substantially less efficient with respect to solvent adsorption. Thus, while the cooling step decreases the amount of solvent which eventually reaches the bed, it simultaneously causes a drop in the adsorption efficiency thereof. Conventional solvent-recovery systems, therefore, have been compromises between competing undesirable characteristics.

Mention should be made of the fact that conventional solvent recovery systems desorb the solvent from the adsorber by treating the latter with steam and frequently discharge a mixture of water vapor and solvent into the atmosphere, at least at the end of the desorption cycle during drying of the adsorbent. Such discharge of solvent into the atmosphere is undesirable for the reasons already stated.

OBJECT OF THE INVENTION

It is the principal object of the present invention to provide an improved method of and an apparatus for the recovery of solvent from an air stream whereby the aforementioned disadvantages are eliminated.

Still another object of the invention is to provide a method of and an apparatus for the recovery of solvents from an air stream, e.g., as may arise in the drycleaning of a fabric or the degreasing of metal objects, in which the adsorption efficiency is increased and early saturation of the adsorber precluded.

Still another object of the invention resides in the provision of a system for recovering solvent from an air stream in which the overall solvent-recovery efficiency is increased and the release of significant or dangerous quantities of solvent into the atmosphere is precluded.

SUMMARY OF THE INVENTION

These objects and others which will be apparent hereinafter are attained, in accordance with the present invention, by providing between the outlet of a cooler along an air-circulating path in which the air stream contains recoverable solvent vapors, and the inlet of an adsorber (preferably containing activated carbon), a reheating device so that the relative humidity of the gas entering the adsorber is substantially less than 100 percent and is preferably below 50 percent.

We have found, most surprisingly, that while the adsorption effectiveness of an activated carbon or similar adsorbent decreases with increasing temperature, the overall efficiency of the system can be increased by reheating the air stream at some point after it leaves the cooler and before it enters the adsorber. The reason for this unexpected result appears to lie in the reduction of the relative humidity of the gas-air mixture and may be the consequence of the fact that the adsorption-inhibiting nature of an elevated relative humidity is more significant than the decrease in adsorption effectiveness with elevated temperatures. When the relative humidity of the gas is decreased, therefore, the adsorber operates more efficiently in spite of the elevation in temperature.

The present invention also enables an intensive cooling of the circulating air to be carried out, with a concomitant reduction of the solvent recovery time because a greater proportion of the solvent is removed by condensation, and yet permits the heating to be relatively substantial so that the relative humidity is extremely low. When, for example, the average operating temperature in a drycleaning machine is about 40°C at the adsorption phase, a water-cooled condenser can be used for air cooling which reduces the air temperature from 20° to 30°C. In the reheating stage, the air can again be brought to a temperature of 40° with a marked increase in the adsorption or solvent-recovery efficiency.

The efficiency increase can be made higher by the use of a refrigerant cycle in which the air cooler is chilled by an expansion of a refrigerating fluid, such as an chlorinated or fluorinated hydrocarbon of the FREON type. In this case, the temperature can be reduced close to 0°C and, after reheating, the air stream may have a temperature below 40°C. Thus, high adsorption efficiency is obtained together with an increased solvent recovery by condensation.

According to another feature of this invention, the air stream is circulated only through the cooler, i.e., the adsorber is bypassed for a period sufficient to reduce the solvent concentration in the air stream to the point at which adsorption efficiency is equal to or greater than condensation efficiency, i.e., until substantially no further solvent can be recovered by condensation. At this point, the adsorber is connected into the circulating path.

Advantageously, the air stream is heated more strongly during circulation in which the adsorber is bypassed and less strongly when the adsorber is in the circulating path. The increased heating during the first phase permits more rapid removal of solvent from the treated product and hence higher gas concentrations and more efficient condensation. Subsequently, when condensation is less efficient, the adsorption device is brought into play as previously described.

To desorb the solvent from the adsorbent the latter is treated after a number of charges in the conventional manner with steam to regenerate the activated carbon. Thereafter, the body of adsorbing material is dried, according to another feature of the invention by circulating air through the adsorber with heating, as previously described, until no further water accumulates in the cooler/condenser. In this way, the drying step may be accelerated since it is carried out with hot air and no solvent or minimum solvent residue is carried off into the atmosphere with the discharged water vapor since the latter is collected in the cooler. In the steam regeneration process it has been found to be advantageous to admit the steam after it has emerged from the adsorber and before condensation, to a distillation vessel so that both the water and the solvent from the adsorber can be subjected to distillation and subsequent condensation whereby the solvent vapors and the water vapors are condensed together. The condensation is effected with the exclusion of the atmosphere and out of contact with the latter, substantially all of the solvent being recovered and prevented from escaping into the atmosphere.

According to another aspect of the invention, a device for carrying out the present process comprises a vessel for the treatment of objects with a liquid solvent and provided with a blower for circulating air along a path through this vessel, an air cooler along this path and an adsorption unit along the path, duct means establishing a closed circulating path through these elements.

Along the circulating path, according to the present invention, between the outlet of the cooler and the inlet of the adsorption device, there is provided an air heater. The outlet of the adsorption device, moreover, is connected to the treatment vessel. According to another feature of this invention, in the circulating path there is provided a bypass connected in shunt across the adsorber by valve means and adapted selectively to connect the air heater to the inlet of the treatment vessel or the adsorption device and the outlet of the adsorption device to the vessel to enable circulation through the cooler and heater until the adsorption device is to be cut into the path.

DESCRIPTION OF THE DRAWING

The above and other objects, features and advantages of the present invention will become more readily apparent from the following description, reference being made to the accompanying drawing in which.

SPECIFIC DESCRIPTION

Figure 2:
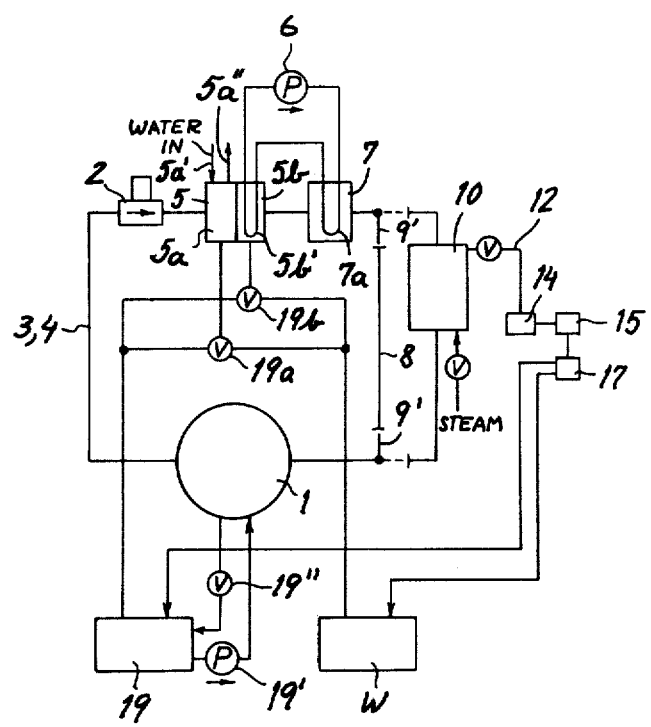
FIG. 2 is a flow diagram illustrating the concepts of the present invention.

Referring first to FIG. 2, it can be seen that the basic apparatus structure, according to the invention, includes a treatment vessel 1 connected by a duct system 3, 4 to a fan or blower 2 capable of inducing air into a circulating flow through the vessel 1. The circulating path comprises a cooler 5 having an upstream portion 5a in the form of a water-cooled condenser in which the water inlet is represented at 5a' and the water outlet at 5a''. The cooler 5 also comprises a condenser 5b, downstream of the heat exchanger 5a, which is cooled by a refrigerant. The refrigerant loop 5b' may be provided with fins or ribs in the conventional manner and is connected to a compressor 6. The heat abstracted by the refrigerant is transferred via loop 7a to the air stream in a heater 7 downstream of the cooler 5.

Valves 9', in their solid-line position, connect the bypass 8 to the heater 7 and establish a closed circulating path through the units 1, 2, 5, 7, 1, as illustrated.

In the broken-line positions of the valve members 9', an activated carbon adsorber 10 may be connected in the circulating path which then extends through the units 1, 2, 5, 7, 10, 1.

The vessel 1 may be charged with the liquid solvent from its receptacle 1 via a pump 19' and the liquid solvent may be drained by a valve 19' into the receptacle 19. Valves 19a and 19b selectively connect the coolers 5a and 5b with the solvent receptacle 19 and a water receptacle W, as illustrated. The operation of the device will be described in greater detail in connection with FIG. 1 in which similar numerals are used to designate functionally identical elements.

Figure 1:
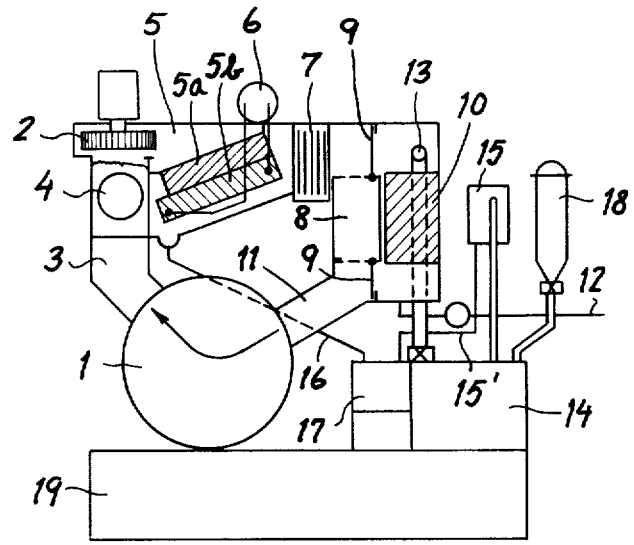
FIG. 1 is a vertical elevational view, partly in diagrammatic form, through a drycleaning apparatus embodying the present invention.

The drycleaning machine of FIG. 1 comprises a drum housing 1 in which the perforated basket or drum carrying the fabric or metal parts to be de degreased is rotatable in the usual manner and can serve to bring about intensive contact between the solvent and the objects.

Upon discharge of the liquid solvent, a drying air stream is induced to pass through the drum housing 1 in the direction of the arrow by a blower 2 which draws the air through the intake duct 3 and a lint filter 4, directing the air stream into the cooler 5.

As previously described, the cooler 5 includes a water cooler 5a and a refrigerant cooler 5b, connected in series, the latter cooler being provided with the compressor 6.

The cooler/condenser 5 is provided upstream of the air heater 7 which is traversed by the cooled air emerging from the cooler. With the flaps 9, 9' in their illustrated position, the air stream is returned directly to the drum housing 1 and circulated until there has been a substantial drop in the solvent concentration by condensation in cooler 5. At this point, the valve flaps 9, 9' are shifted into their broken-line positions and the adsorber 10 is connected in the circuit. The residual solvent is thereupon picked up by the adsorber bed. The air is returned via duct 11 to the drum housing 1.

For recovery of the solvent from the adsorbent, a valved line 12 induces steam to flow upwardly through the adsorber 10 and the steam, and extracted solvent vapors are collected in the distillation vessel 14, condensed at the condenser 15 and discharged in the solvent water separator 17 into respective compartments. The line leading to the condenser 15 is represented at 15' and the distillation vessel 14 is provided with an adsorber 18 communicating with the atmosphere and designed to prevent the development of elevated pressures within the still 14, 15 without permitting solvent vapors to enter the atmosphere.

Once the steam desorption step is completed, blower 2 circulates air through the units 1, 2, 5, 7, 10, 1 so that air is heated at 7, contacts the adsorber at an elevated temperature and hence expedites discharge of residual mixture and/or solvent. The moisture-laden drying air is cooled at 5 to condense water from the system and reheated at 7. The drying current flow of air is terminated when no further moisture is collected at the cooler 5.

We claim:

1. A method of recovering solvent from an air stream in a dry-cleaning machine containing vapors of the solvent in the presence of air moisture, comprising the steps of circulating said air stream along a path through said machine and into contact with goods to be dried therein; cooling said air stream at a first location along said path to condense condensible components therefrom; reheating said air stream at a second location along said path downstream of said first location to decrease the relative humidity of the air stream; and treating said air stream after the reheating thereof with a solvent adsorber at a third location along said path downstream of said second location.

2. The method defined in claim 1, further comprising the steps of bypassing said third location upon circulation of said air stream until the condensation of said solvent from said air stream at said first location is no longer more efficient than the adsorption of the solvent therefrom at said third location.

3. The method defined in claim 2 wherein the air is heated more strongly at said second location during bypassing of said third location than thereafter.

4. The method defined in claim 1, further comprising the step of regenerating said adsorber by treating the same with steam and thereafter drying said adsorber by circulating air therethrough between said location until water no longer condenses at said first location.

5. The method defined in claim 4 wherein the steam upon traversal of said adsorber is introduced into a distillation vessel prior to its condensation.

6. In a dry-cleaning machine an apparatus for the recovery of a solvent from an air stream, comprising circulating means defining a circulating path for said air stream; cooling means at a first location along said path for cooling said air stream to condense condensible components therefrom; reheating means at a second location along said path downstream from said cooling means for reheating said air stream to decrease the relative humidity thereof; and adsorption means traversed by the reheated air stream at a third location along said path downstream of said location for adsorbing solvent contained in the reheated air stream.

7. The apparatus defined in claim 6, further comprising a treatment vessel along said path ahead of said first location for subjecting articles to treatment with said solvent, said circulating means passing said air stream through said vessel.

8. The apparatus defined in claim 7, further comprising bypass means selectively operable to connect said reheating means to said vessel and shunting said adsorption means for recirculation of said air stream through said vessel, said cooling means and said reheating means until the concentration of said solvent in said air stream has been reduced to a predetermined level.

9. The apparatus defined in claim 8, further comprising regenerating means including means for introducing steam into said adsorption means, and a distillation vessel connected to said adsorption means for collecting steam traversing same.

10. The apparatus defined in claim 9 wherein said vessel is a drum for the treatment of fabric or metal objects.

* * * * *